(12) United States Patent
Feng et al.

(10) Patent No.: US 12,167,125 B2
(45) Date of Patent: Dec. 10, 2024

(54) ACTIVE CAMERA RELOCATION METHOD HAVING ROBUSTNESS TO ILLUMINATION (71) Applicant: TIANJIN UNIVERSITY, Tianjin (CN)

(72) Inventors: Wei Feng, Tianjin (CN); Liang Wan, Tianjin (CN); Nan Li, Tianjin (CN); Qian Zhang, Tianjin (CN); Chen Meng, Tianjin (CN); Xiaowei Wang, Gansu (CN); Bomin Su, Gansu (CN)

(73) Assignee: TIANJIN UNIVERSITY, Tianjin (CN)

( * ) Notice: Subject to any disclaimer, the term of this patent is extended or adjusted under 35 U.S.C. 154(b) by 159 days.

(21) Appl. No.: 18/018,820

(22) PCT Filed: Aug. 6, 2021

(86) PCT No.: PCT/CN2021/111064
§ 371 (c)(1),
(2) Date: Jan. 30, 2023

(87) PCT Pub. No.: WO2022/028554
PCT Pub. Date: Feb. 10, 2022

(65) Prior Publication Data
US 2023/0300455 A1 Sep. 21, 2023

(30) Foreign Application Priority Data
Aug. 6, 2020 (CN) .......................... 202010783333.1

(51) Int. Cl.
H04N 23/60 (2023.01)
G06T 7/62 (2017.01)
(Continued)

(52) U.S. Cl.
CPC ............... *H04N 23/64* (2023.01); *G06T 7/62* (2017.01); *G06T 7/74* (2017.01); *G06T 7/80* (2017.01);
(Continued)

(58) Field of Classification Search
CPC .... H04N 23/6811; H04N 23/695; G06T 7/11; G06T 7/62; G06T 7/73; G06T 7/74;
(Continued)

(56) References Cited

U.S. PATENT DOCUMENTS

2014/0369557 A1 12/2014 Kayombya et al.
2019/0180421 A1* 6/2019 Kim ........................ G06T 11/00

FOREIGN PATENT DOCUMENTS

CN 106595601 A 4/2017
CN 108648240 A 10/2018
(Continued)

OTHER PUBLICATIONS

International Search Report of PCT/CN2021/111064.
Written Opinion of PCT/CN2021/111064.

*Primary Examiner* — Daniel M Pasiewicz (57) ABSTRACT

The present disclosure discloses an active camera relocation method having robustness to illumination includes the following steps: extracting effective plane region image sets of scenes in a current observation image T and a reference observation image R; establishing a matching relationship in the effective plane region image sets T and R; obtaining a camera relative pose $P_i$ guided by each group of matched planes; obtaining information for guiding the motion of a camera by fusing all camera relative poses $P_i$; determining whether a relocation process is completed by motion steps.

16 Claims, 4 Drawing Sheets (51) Int. Cl.
  *G06T 7/73* (2017.01)
  *G06T 7/80* (2017.01)
  *H04N 23/695* (2023.01)

(52) U.S. Cl.
  CPC . *H04N 23/695* (2023.01); *G06T 2207/20221* (2013.01); *G06T 2207/30244* (2013.01)

(58) Field of Classification Search
  CPC ............. G06T 7/80; G06T 2207/20221; G06T 2207/30244
  See application file for complete search history.

(56)          References Cited

FOREIGN PATENT DOCUMENTS

CN        111402331 A     7/2020
CN        112070831 A    12/2020

* cited by examiner

| Scenes | Evaluation index | Relocation method of the present disclosure | Existing optional relocation method |
|---|---|---|---|
| Common scene 1 | Relocation time (second) Relocation accuracy (AFD value) | 201.7 1.077 | 267.1 1.082 |
| Common scene 2 | Relocation time (second) Relocation accuracy (AFD value) | 193.5 0.633 | 235.2 0.626 |
| Illumination change scene 1 | Relocation time (second) Relocation accuracy (AFD value) | 196.8 2.078 | 246.0 Relocation fails |
| Illumination change scene 2 | Relocation time (second) Relocation accuracy (AFD value) | 188.7 1.416 | 231.7 28.77 |
| Structural change scene 1 | Relocation time (second) Relocation accuracy (AFD value) | 191.7 7.015 | 241.4 41.53 |
| Structural change scene 2 | Relocation time (second) Relocation accuracy (AFD value) | 200.9 3.859 | 277.3 27.13 |

FIG. 4

ACTIVE CAMERA RELOCATION METHOD HAVING ROBUSTNESS TO ILLUMINATION

CROSS-REFERENCE TO RELATED APPLICATIONS

This Application is a national stage application of PCT/CN2021/111064. This application claims priorities from PCT Application No. PCT/CN2021/111064, filed Aug. 6, 2021, and from the Chinese patent application 2020107833331 filed Aug. 6, 2020, the content of which are incorporated herein in the entirety by reference.

TECHNICAL FIELD

The present disclosure belongs to the field of artificial intelligence and computer vision, and relates to an active vision technology, in particular to an active camera relocation method having robustness to illumination.

BACKGROUND

Active camera relocation aims to physically and realistically restore a six-degree-of-freedom pose of a camera to be consistent with that when a reference image is photographed, which plays an important role in the fields of environmental monitoring, preventive protection of historical and cultural heritage, small change detection, and the like, and is an important application of an active vision technology [1]. An active camera relocation process includes relative pose estimation of the camera and dynamic adjustment of the camera. The adjustment of the camera is completed by a robot platform.

The most advanced active camera relocation method at present has achieved a great success in a small change detection task of cultural heritage in a large number of wild occurrence environments [2]. But it is to be noted that these monitoring tasks are carried out under stable and controllable environmental conditions. Under such conditions, a feature matching result of an adopted image can support accurate camera pose estimation.

However, monitoring results are not satisfactory when the illumination conditions (direction and intensity) of all previous observations are different. The significant difference of illumination will change the appearance of a scene (especially a ubiquitous three-dimensional structural scene), and then a feature point descriptor in an image involving pose estimation will change, resulting in the failure of the camera pose estimation. In addition, if a background in an observation scene (a non-monitored object region) changes greatly, for example, the vegetation near a monitored ancient building may change dramatically in different seasons (even have structural changes), which will significantly increase the number of mismatched feature points in the image and seriously affect the accuracy of a relocation result. The above mentioned two situations which are common in practical tasks will seriously damage the accuracy of active camera relocation and lead to an unreliable actual monitoring result, thus unable to support a relocation operation under outdoor uncontrollable environmental conditions.

CITED REFERENCES

[1] Feng W, Tian F P, Zhang Q, et al. Fine-Grained Change Detection of Misaligned Scenes with Varied Illuminations [C] ICCV. IEEE, 2015.

[2] Tian F P, Feng W, Zhang Q, et al. Active camera relocalization from a single reference image without hand-eye calibration [J]. IEEE transactions on pattern analysis and machine intelligence, 2018, 41(12): 2791-2806.

[3] Feng W, Sun J Z, Zhang Q, Tian F P, Han R Z, Accurate Relocation Method for Six-Degree-of-Freedom Pose of Camera without Hand-Eye Calibration, CN201611140264.2.

SUMMARY

The present disclosure provides two active camera relocation methods with the same inventive concept. Motion information of a camera is jointly estimated by using all effective planes in an observation scene, which effectively reduces the dependence of an existing relocation method on illumination consistency and scene structure consistency of all previous observation scenes, and meanwhile, effectively reduces the time cost of a relocation process, so as to support a reliable and efficient outdoor task operation. The technical solutions are as follows:

An active camera relocation method having robustness to illumination includes the following steps:

Step I: extracting effective plane region image sets $T=\{T_n^P\}_{n=1}^N$ and $R=\{R_m^P\}_{m=1}^M$ of scenes in a current observation image T and a reference observation image R;

Step II: establishing a matching relationship in the effective plane region image sets T and R, which adopts the following method:

(1) for the effective plane region image set T, calculating the number of SIFT feature points of each plane region image $T_i^P$ calculating the minimum Euclidean distance between every two plane region images; performing the same operation on the effective plane region image set R;

(2) for the effective plane region image set T, establishing an undirected fully connected graph $G_1=\{V^{(1)},E^{(1)}\}$ by taking each plane region image $T_i^P$ as a node; performing the same operation on the effective plane region image set R to obtain an undirected fully connected graph $G_2=\{V^{(2)},E^{(2)}\}$;

(3) solving a graph matching problem between q and C by taking the numbers of the SIFT feature points of the plane images as node weights of the graphs and the Euclidean distances between the plane images as edge weights of the graphs, and establishing a matching relationship $S=\{(R_i^P, T_i^P)\}_{i=1}^L$ in the effective plane region image sets T and R;

Step III: obtaining a camera relative pose $P_i$ guided by each group of matched planes; and Step IV: obtaining information for guiding the motion of a camera by fusing all camera relative poses $P_i$.

Step I specifically includes:

(1) for an observation object, selecting an original scene image, and respectively detecting plane regions of scenes in a current observation image T and a reference observation image R to obtain plane region image sets $T=\{T_n^P\}$ and $R=\{R_m^P\}$;

(2) respectively selecting effective plane regions from the plane region image sets $T=\{T_n^P\}$ and $R=\{R_m^P\}$ to obtain effective plane region image sets $T=\{T_n^P\}_{n=1}^N$ and $R=\{R_m^P\}_{m=1}^M$, where the method is as follows:

first step: determining an area ratio: respectively calculating the ratio of an image area of the detected plane region to the area of the original scene image;

second step: setting a threshold value, and respectively selecting regions with the ratio of the image area of the plane region to the area of the scene image greater than the threshold value from the sets $T=\{T_n^P\}$ and $R=\{R_m^P\}$ to form effective plane region image sets $T=\{T_n^P\}_{n=1}^{N}$ and $R=\{R_m^P\}_{m=1}^{M}$;

third step: if the ratios of the image area of all plane regions in the sets $T=\{T_n^P\}$ and $R=\{R_m^P\}$ are less than the threshold value, determining the effective plane region image sets $T=\{T_n^P\}_{n=1}^{N}$ and $R=\{R_m^P\}_{m=1}^{M}$ according to the image regions with the larger area ratio of the plane region in the respective sets;

(3) performing image morphological corrosion on all plane region images in the effective plane region image sets $T=\{T_n^P\}_{n=1}^{N}$ and $R=\{R_m^P\}_{m=1}^{M}$ to obtain all effective plane region image sets $T=\{T_n^P\}_{n=1}^{N}$ and $R=\{R_m^P\}_{m=1}^{M}$.

The threshold value set in the second step may be 10%.

Step III specifically includes:

first step: for each pair of matched planes $(R_i^P, T_i^P)$, calculating a homography matrix $H_i$ between $T_i^P$ and $R_i^P$; and second step: respectively performing singular value decomposition on each homography matrix $H_i$ to solve corresponding rotation matrix and translation vector, that is, the camera relative pose $P_i$ guided by the group of matched planes.

Step IV specifically includes:

(1) determining the number of the SIFT feature points participating in the calculation of each camera relative pose $P_i$ and the distribution of the feature points on a plane;

(2) performing weight fusion according to the number of the SIFT feature points, that is a numerical weight, corresponding to each camera relative pose $P_i$ and the distribution situation, that is a distribution weight, of the SIFT feature points, and performing weighted fusion on all camera relative poses P according to respective influence proportion of the numerical weight and the distribution weight on the camera relative pose, so as to obtain final information for guiding the motion of the camera; a method for determining the numerical weight and the distribution weight is as follows:

first step: the numerical weight $\varphi_i$ being determined by using the ratio of the number of the feature matching point pairs participating in the calculation of the camera relative poses $P_i$ to the number of the feature matching point pairs participating in the calculation of all L camera relative poses in the matching relationship s;

second step: the distribution weight $\eta_i$ being determined by: clipping the effective plane region image $T_i^P$ participating in the calculation of camera relative pose $P_i$ according to a circumscribed rectangle of a plane region shape to generate $\overline{T}_i^P$, uniformly segmenting $\overline{T}_i^P$ into grid regions, counting the number of the feature matching points participating in the calculation of camera relative pose $P_i$ in each grid region, and calculating the variance of the numbers of these related feature matching points distributed in various grid regions, so as to calculate the distribution weight, where the smaller the variance, the higher the weight.

Meanwhile, the present disclosure further provides an active camera relocation method having robustness to illumination, which includes the following steps:

Step I: extracting effective plane region image sets $T=\{T_n^P\}_{n=1}^{N}$ (where N represents a total number of planes, n is a plane index, and p is an identifier representing a plane) and $R=\{R_m^P\}_{m=1}^{M}$ (where M represents a total number of planes, m is a plane index, and p is an identifier representing a plane) of scenes in a current observation image T and a reference observation image R;

Step II: establishing a matching relationship in the effective plane region image sets T and R, which adopts the following method:

(1) for the effective plane region image set T, calculating the number of the SIFT feature points of each plane region image $T_n^P$; calculating the minimum Euclidean distance between every two plane region images; and performing the same operation on the effective plane region image set R;

(2) for the effective plane region image set T, establishing an undirected fully connected graph $G_1=\{V^{(1)}, E^{(1)}\}$ (where V represents a node set, and each node corresponds to one plane; and E is an edge set, and each edge represents the Euclidean distance between the planes represented by two nodes on the edge) by taking each plane region image $T_n^P$ as a node; and performing the same operation on the effective plane region image set R to obtain an undirected fully connected graph $G_2=\{V^{(2)}, E^{(2)}\}$;

(3) solving a graph matching problem between $G_1$ and $G_2$ by taking the numbers of the SIFT feature points of the plane images as node weights of the graphs and the Euclidean distances between the plane images as edge weights of the graphs, and establishing a matching relationship $S=\{(R_i^P, T_i^P)\}_{i=1}^{L}$ in the effective plane region image sets T and R (where L represents the number of images with the matching relationship in the current observation image and the reference observation image, and i is an index);

Step III: obtaining a camera relative pose $P_i$ guided by each group of matched planes;

Step IV: obtaining information for guiding the motion of a camera by fusing all camera relative poses $P_i$; and Step V: determining whether a relocation process is completed or not; ending the method if the relocation is completed; otherwise, repeating and iterating Step I to Step V.

Preferably, Step I specifically includes:

(1) for an observation object, selecting an original scene image, and respectively detecting plane regions of scenes in a current observation image T and a reference observation image R to obtain plane region image sets $T=\{T_n^P\}$ and $R=\{R_m^P\}$;

(2) respectively selecting effective plane regions from the plane region image sets $T=\{T_n^P\}$ and $R=\{R_m^P\}$ to obtain effective plane region image sets $T=\{T_n^P\}_{n=1}^{N}$ and $R=\{R_m^P\}_{m=1}^{M}$, where the method is as follows:

first step: determining an area ratio: respectively calculating the ratio of an image area of the detected plane region to the area of the original scene image;

second step: setting a threshold value, and respectively selecting regions with the ratio of the image area of the plane region to the area of the scene image greater than the threshold value from the sets $T=\{T_n^P\}$ and $R=\{R_m^P\}$ to form effective plane region image sets $T=\{T_n^P\}_{n=1}^{N}$ and $R=\{R_m^P\}_{m=1}^{M}$;

third step, if the ratios of the image area of all plane regions in the sets $T=\{T_n^P\}$ and $R=\{R_m^P\}$ are all less than the threshold value, determining the effective plane region image sets $T=\{T_n^P\}_{n=1}^{N}$ and $R=\{R_m^P\}_{m=1}^{M}$ according to the image regions with the larger area ratio of the plane region in respective set;

(3) performing image morphological corrosion on all plane region images in the effective plane region image sets $T=\{T_n^P\}_{n=1}^N$ and $R=\{R_m^P\}_{m=1}^M$ to obtain all effective plane region image sets $\{T_n^P\}_{n=1}^N$ and $\{R_m^P\}_{m=1}^M$.

The threshold value set in the second step may be 10%.

Step III specifically includes:

first step: for each pair of matching planes $(R_i^P, T_i^P)$, calculating a homography matrix $H_i$ between $T_i^P$ and $R_i^P$;

second step: respectively performing singular value decomposition on each homography matrix $H_i$ to solve corresponding rotation matrix and translation vector, that is, the camera relative pose $P_i$ guided by the group of matched planes.

Step IV specifically includes:

(1) determining the number of the SIFT feature points participating in the calculation of each camera relative pose $P_i$ and the distribution of the feature points on a plane;

(2) performing weight fusion according to the number of the SIFT feature points, that is a numerical weight, corresponding to each camera relative pose $P_i$ and the distribution situation, that is a distribution weight, of the SIFT feature points, and performing weighted fusion on all camera relative poses P according to respective influence proportion of the numerical weight and the distribution weight on the camera relative pose, so as to obtain final information for guiding the motion of the camera, where a method for determining the numerical weight and the distribution weight is as follows:

first step: the numerical weight $\varphi_i$ being determined by using the ratio of the number of the feature matching point pairs participating in the calculation of the camera relative pose $P_i$ to the number of the feature matching point pairs participating in the calculation of all L camera relative poses in the matching relationship s;

second step: the distribution weight $\eta_i$ being determined by: clipping the effective plane region image $T_i^P$ participating in the calculation of the camera relative pose $P_i$ according to a circumscribed rectangle of a plane region shape to generate $T_i^P$, uniformly segmenting $T_i^P$ into grid regions, counting the number of the feature matching points participating in the calculation of the camera relative pose $P_i$ in each grid region, and calculating the variance of the numbers of these related feature matching points distributed in various grid regions, so as to calculate the distribution weight, where the smaller the variance, the higher the weight.

Step V specifically includes:

determining whether to end the relocation according to the scale of a translation dimension in camera motion information; and when a motion step is less than a step threshold value $\xi$, determining that a relocation process is completed, and ending the relocation; and otherwise, repeating Step I to Step V.

The technical solutions provided by the present disclosure have the following beneficial effects.

1. In the relocation process of the present disclosure, the estimation of the camera motion information (that is the camera relative pose) is based on a plane, which can effectively reduce the influence of different appearances of the observed three-dimensional scenes caused by different illumination conditions (e.g. direction and intensity) on the estimation of the camera relative pose; and meanwhile, the influence of structural changes of the observed three-dimensional scenes on the estimation of the camera relative pose can be effectively reduced by the selection and matching of the effective planes. Therefore, an existing relocation device can operate reliably outdoors, and the limitations of an active camera relocation operation scene caused by scene illumination differences and the structural changes can be basically shielded.

2. In the relocation process of the present disclosure, a mathematical method used for calculating the camera motion information (that is the camera relative pose) is different from the existing relocation method, which effectively reduces the time cost in the relocation process, and can make the existing relocation device operate more efficiently.

DETAILED DESCRIPTION OF THE PRESENT DISCLOSURE

The technical solutions in the present disclosure are described below clearly and completely with reference to the accompanying drawings. Based on the technical solutions in the present disclosure, all other embodiments obtained by those of ordinary skill in the art without creative work shall fall within the scope of protection of the present disclosure.

Embodiment 1

(I) Determination of Effective Plane

Before a relocation process is started, all effective plane region image sets $T=\{T_n^P\}_{n=1}^N$ and $R=\{R_m^P\}_{m=1}^M$ of scenes in a current observation image T and a reference observation image R are extracted. Specific steps are as follows:

(1) plane regions of the scenes in the current observation image T and the reference observation image R are respectively detected to obtain plane region image sets $T=\{T_n^P\}$ and $R=\{R_m^P\}$.

Note 1: Detection of Plane Regions in Images

The plane regions in the current observation image T and the reference observation image R are respectively detected by a traditional homography matrix-based plane detection method or a deep network model-based machine learning method to obtain sets $\{T_n^P\}$ and $R=\{R_m^P\}$.

(2) Effective plane regions are respectively selected from the effective plane region image sets T and R to obtain effective plane region image sets $T=\{T_n^P\}_{n=1}^N$ and $\{R_m^P\}_{m=1}^M$.

Note 2: Selection of Effective Plane Regions

First step: an area ratio is determined. Ratios of the image area of all detected plane regions to the area of an original scene image are respectively calculated.

Second step: regions with the ratios of the image area of the plane regions to the area of the scene image being greater than 10% are respectively selected from the sets $T=\{T_n^P\}$ and $R=\{R_m^P\}$ to form effective plane region image sets $T=\{T_n^P\}_{n=1}^N$ and $\{R_m^P\}_{m=1}^M$.

Third step: if all area ratios in the sets $T=\{T_n^P\}$ and $R=\{R_m^P\}$ are all less than 10%, then the image regions with the top five area ratios of the plane regions in respective set are respectively selected to form the effective plane region image sets $T=\{T_n^P\}_{n=1}^N$ and $\{R_m^P\}_{m=1}^M$ (the actual number of image regions are selected if the image regions are less than five).

(3) Image morphological corrosion is performed on all plane region images in the effective plane region image sets T and R to obtain all effective plane region image sets $T=\{T_n^P\}_{n=1}^N$ and $R=\{R_m^P\}_{m=1}^M$.

(II) Establishment of Plane Matching Relationship

A method for establishing a matching relationship in the effective plane region image sets T and R is as follows.

(1) For the effective plane region image set T, the number of SIFT feature points of each plane region image $T_i^P$ is calculated, and the minimum Euclidean distance between every two plane region images is calculated. The same operation is performed on the effective plane region image set R.

(2) For the effective plane region image set T, an undirected fully connected graph G is established by taking each plane region image $T_i^P$ as a node. The same operation is performed on the effective plane region image set R to obtain an undirected fully connected graph q.

(3) A graph matching problem between q and q is solved by taking the numbers of the SIFT feature points of the plane images as node weights of graphs and the Euclidean distances between the plane images as edge weights of the graphs, and a matching relationship $S=\{(R_i^P, T_i^P)\}_{i=1}^L$ in the effective plane region image set T and R is established.

Note 3: Establishment and Solution of Graph Matching Problem

First step, node similarity metric of a graph and an edge similarity metric of the graph are established. The node similarity between two established graphs is measured by a node weight matrix, and a metric basis is the number of the SIFT feature points with a matching relationship established on a plane image represented by two nodes between different graphs; and the edge similarity between the two established graphs is measured by an edge weight matrix. Specifically, an edge in the same graph represents the minimum Euclidean distance between the plane images represented by the two nodes connected thereto, and the edge similarity is measured by an absolute value of the difference between the minimum Euclidean distances represented by the edges between the two established graphs.

Second step: a problem objective function is established. A node similarity weight matrix of the graph and an edge similarity weight matrix of the graph in the first step are integrated by using matrix w, where a diagonal element of w represents the node similarity between two graphs, and all off-diagonal elements of w represent the edge similarity between the two graphs. An objective function is established to solve an optional distribution matrix X*:

$X^* = \max(X_c^T W X_c)$, the solved optional distribution matrix includes a matching situation of the nodes in q and q, so as to obtain a matching relationship $S=\{(R_i^P, T_i^P)\}_{i=1}^L$ in the effective plane region image sets T and R.

Note: $X \in \{1,0\}^{m \times n}$ is used to represent the node matching situation between q and $G_2 = X_{ij} = 1$ represents that node V in q is matched with node $V_j$ in $G_2$, and $X_{ij}=0$ represents that the node V in is not matched with the node $V_j$. $X_c$ is a column expansion form of X.

(III) Estimation of Camera Relative Pose Guided by Matched Plane Group

A specific method for obtaining a camera relative pose $P_7$ guided by each group of matched planes is as follows:

(1) For each pair of matched planes $(R_i^P, T_i^P)$, calculating a homography matrix $H_i$ between $T_i^P, R_i^P$.

Note 4: Calculation of Homography Matrix Between Matched Plane Pairs

First step: feature matching is performed. SIFT feature points are extracted by using an established matching plane part. For all feature points in TT, a feature point closest to a descriptor of the $R_i^P$ is searched in the $R_i^P$ as a matching feature point.

A final matching point set obtained is that: feature point set $X=[x_1, x_2, \ldots, x_N]_{3 \times N}$ in $T_i^P$ corresponds to the feature point set $Y=[y_1, y_2, \ldots, y_N]_{3 \times N}$ in $R_i^P$ in sequence, where both $x_i, y_i$ are homogeneous coordinates.

Second step: the homography matrix is calculated. Four pairs of matching points are randomly selected from X,Y, data is normalized, and a transformation matrix H is solved and is recorded as model M. Projection errors between all data in a data set and the model M are calculated, and the number of interior points is recorded. A transformation matrix corresponding to an optimal model is selected as a homography matrix $H_i$ between $D_i^P, C_i^P$ after iteration is completed.

(2) Singular value decomposition is performed for each homography matrix $H_i$ to solve corresponding rotation matrix and translation vector, that is, the camera relative pose $P_i$ guided by the group of matched planes.

Note 5: Estimation of Camera Relative Pose Guided by Matched Plane Pair

First step: a candidate camera relative pose is calculated. For each homography matrix H and a camera internal parameter matrix K, $A=K^{-1}HK$ may be obtained. Singular value decomposition $A=U\Lambda V^T$ of a matrix is performed on A, where $\Lambda=\text{diag}(\lambda_1,\lambda_2,\lambda_3)(\lambda_1 \geq \lambda_2 \geq \lambda_3)$ According to the physical meaning of the homography matrix, it may be obtained that rotation matrix r, translation vector t, plane normal vector n, and the distance d between a plane and a camera have the following relationship:

$$\begin{cases} r' = sU^T rV \\ t' = U^T t \\ n' = V^T n \\ d' = sd \\ s = \det U \det V \end{cases}$$

Then, $\Lambda = d'r' + t'n'^T$, eight groups of arithmetic solutions $\{(r_i, t_i)\}_{i=1}^8$ may be obtained by solving the equation, that is, a candidate sequence of the camera relative pose guided by the matched planes corresponding to the decomposed homography matrix H.

Second step: a camera relative pose is selected. The matching feature points participating in calculation are triangulated by using each group of arithmetic solutions $(r_i, t_i)$ in the candidate sequence of the camera relative pose to restore three-dimensional spatial point coordinates corresponding to feature points on an image. The number of the three-dimensional spatial points restored by each group of arithmetic solutions satisfying that the spatial points are located in front of a camera model is counted, and meanwhile, re-projection errors are counted. Finally, the group of arithmetic solutions with the largest number of spatial points located in front of the camera model and a small re-projection error is the camera relative pose $P_i$ guided by a group of matched planes.

(IV) Obtaining of Information for Guiding Motion of Camera

A specific method for obtaining the information for guiding the motion of the camera by fusing all camera relative poses $P_i$ is as follows:

(1) The number of the SIFT feature points participating in the calculation of each camera relative poses $P_i$ and the distribution of the feature points on the plane are determined.

(2) Weight fusion is performed on all camera relative poses $P_i$ by taking the number of the SIFT feature points corresponding to each camera relative pose $P_i$ and the distribution situation as weights, so as to obtain final information $\overline{P}$ for guiding the motion of the camera.

Note 6: Establishment of Fusion Weight

First step: numerical weight $\varphi_i$ is determined by using the ratio of the number of the feature matching point pairs participating in the calculation of camera relative pose $P_i$ to the number of the feature matching point pairs participating in the calculation of all L camera relative poses in S.

Second step: distribution weight $\eta_i$: the effective plane region image $T_i^P$ participating in the calculation of the camera relative poses $P_i$ is clipped according to a circumscribed rectangle of a plane region shape to generate $\overline{T}_i^P$, $\overline{T}_i^P$ is uniformly segmented into a 10×10 grid region, the number of the feature matching points participating in the calculation of $P_i$ in each grid region is counted, and the variance of the numbers of these related feature matching points distributed in various grid regions is calculated, so as to calculate the distribution weight, where the smaller the variance, the higher the weight.

Note 7: Determination of Information for Guiding Motion of Camera

First step: the rotation matrix in $P_i$ is transformed into an Euler angle expression form, that is, $r \equiv \left( r^x, r^y, r^z \right)$. Where, $r^X, r^Y, r^Z$ respectively represent Euler rotation angles in three coordinate directions in a three-dimensional space.

Second step: all camera relative poses $P_i$ are fused by using the calculated numerical weight q and the distribution weight $\eta_1$.

$$\begin{cases} \bar{r}^* = \sum_{i=1}^{K} (\sigma_1 \varphi_i r_i^* + \sigma_2 \eta_i r_i^*) \\ \bar{t} = \sum_{i=1}^{K} (\sigma_1 \varphi_i t_i + \sigma_2 \eta_i t_i) \\ * \in \{X, Y, Z\} \end{cases}$$

Where, $\sigma_1$, $\sigma_2$ ($\sigma_1 + \sigma_2 = 1$) represent the influence proportions of the numerical weight and the distribution weight on the fusion, and the final information $\overline{P}$ for guiding the motion of the camera is obtained. Based on experience, the influence proportions of the numerical weight and the distribution weight on the fusion are 0.8 and 0.2 respectively.

(V) Determination of Completion of Relocation

A specific method for determining whether a relocation process is completed or not includes:

since the calculated translation vector inevitably lacks a physical real scale, the motion of the camera is guided, according to the translation direction information provided by the obtained translation vector, by using a "binary half-division" strategy used in the existing relocation method. When a motion step is less than a threshold value ξ, it is determined that the relocation process is completed, and the relocation is ended; and otherwise, Step (I) to Step (V) are repeated. When it is not the first iteration, the plane region in a scene in a reference image does not need to be extracted repeatedly in Step I, and primary information is used.

Embodiment 2

Embodiment 2 of this patent application is a further refinement of Embodiment 1. The place where the same parameters in Embodiment 1 are not clearly defined is subjected to supplementary definition in Embodiment 2. In addition, apparatus parts of Embodiment 2 are improved to some extent, and the apparatus parts are described.

(I) Determination of Effective Plane

Before a relocation process is started, all effective plane region image sets $\{T_n^P\}_{n=1}^{N}$ (where N represents a total number of planes, n represents a plane index, and P is an identifier representing a plane) and $\{R_m^P\}_{m=1}^{M}$ (where M representing a total number of planes, m is a plane index, and P is an identifier represents a plane) of scenes in a current observation image T and a reference observation image R are extracted. Specific steps are as follows:

(1) Plane regions of the scenes in the current observation image T and the reference observation image R are respectively detected to obtain plane region image sets $\{T_n^P\}$ and $R = \{R_m^P\}$.

Note 1: Detection of Plane Regions in Images

The plane regions in the current observation image T and the reference observation image R are respectively detected by a traditional homography matrix-based plane detection method or a deep network model-based machine learning method to obtain sets $T = \{T_n^P\}$ and $R = \{R_m^P\}$.

(2) Effective plane regions are respectively selected from T and R to obtain effective plane region image sets $\{T_n^P\}_{n=1}^{N}$ and $\{R_m^P\}_{m=1}^{M}$.

Note 2: Selection of Effective Plane Regions

First step: an area ratio is determined. Ratios of the image area of all detected plane regions to the area of an original scene image are respectively calculated.

Second step: regions with the ratios of the image area of the plane regions to the area of the scene image greater than 10% are respectively selected from the sets $T = \{T_n^P\}$ and $R = \{R_m^P\}$ to form effective plane region image sets $T = \{T_n^P\}_{n=1}^{N}$ and $R = \{R_m^P\}_{m=1}^{M}$.

Third step, if all area ratios in the sets $T = \{T_n^P\}$ and $R = \{R_m^P\}$ are all less than 10%, then the image regions with the top five area ratios of the plane regions in respective set are respectively selected to form the effective plane region image sets $\{T_n^P\}_{n=1}^{N}$ and $\{R_m^P\}_{m=1}^{M}$ (the actual number of image regions prevails if the image regions are less than five).

(3) Image morphological corrosion is performed on all plane region images in the effective plane region image sets T and R to obtain all effective plane region image sets $\{T_n^P\}_{n=1}^{N}$ and $R = \{R_m^P\}_{m=1}^{M}$.

(II) Establishment of Plane Matching Relationship

A method for establishing a matching relationship in the effective plane region image sets T and R is as follows.

(1) For the effective plane region image set T, the number of SIFT feature points of each plane region image $T_i^P$ is calculated, and the minimum Euclidean distance between every two plane region images is calculated. The same operation is performed on the effective plane region image set R.

(2) For the effective plane region image set T, an undirected fully connected graph G is established by taking each plane region image $T_i^P$ as a node. The same operation is performed on the effective plane region image set R to obtain an undirected fully connected graph $G_2$.

(3) A graph matching problem between q and q is solved by taking the numbers of the SIFT feature points of the plane images as node weights of graphs and the Euclidean distances between the plane images as edge weights of the graphs, and a matching relationship $S=\{(R_i^P, T_i^P)\}_{i=1}^L$ in the effective plane regions image set T and R is established.

Note 3: Establishment and Solution of Graph Matching Problem

First step, node similarity metric of a graph and an edge similarity metric of the graph are established. The node similarity between two established graphs is measured by a node weight matrix, and a measurement basis is the number of the SIFT feature points with a matching relationship established on a plane image represented by two nodes between different graphs; and the edge similarity between the two established graphs is measured by an edge weight matrix. Specifically, an edge in the same graph represents the minimum Euclidean distance between the plane images represented by the two nodes connected thereto, and the edge similarity is measured by an absolute value of the difference between the minimum Euclidean distances represented by the edges between the two established graphs.

Second step: a problem objective function is established. A node similarity weight matrix of the graph and an edge similarity weight matrix of the graph in the first step are integrated by using matrix w, where a diagonal element of w represents the node similarity between two graphs, and all off-diagonal elements of w represent the edge similarity between the two graphs. An objective function is established to solve an optional distribution matrix X*:

$$X^* = \max(X_c^T W X_c),$$

the solved optional distribution matrix includes a matching situation of the nodes in $G_1$ and $G_2$, so as to obtain a matching relationship $S=\{(R_i^P, T_i^P)\}_{i=1}^L$ in the effective plane region image sets T and R.

Note: $X \in \{1,0\}^{m \times n}$ is used to represent the node matching situation between $G_1$ and $G_2$, $X_{ij}=1$ represents that node $V_i$ in $G_1$ is matched with node $V_j$ in $G_2$, and $X_{ij}=0$ represents that the node V in is not matched with the node $V_j$. $X_c$ is a column expansion form of X.

(III) Estimation of Camera Relative Pose Guided by Matched Plane Group

A specific method for obtaining a camera relative pose $P_i$ guided by each group of matched planes is as follows:

(1) For each pair of matched planes $(R_i^P, T_i^P)$, calculating a homography matrix $H_i$ between $T_i^P$, $R_i^P$.

Note 4: Calculation of Homography Matrix Between Matched Plane Pairs

First step: feature matching is performed. SIFT feature points are extracted by using an established matching plane part. For all feature points in $T_i^P$, a feature point closest to a descriptor of the $R_i^P$ is searched in the $R_i^P$ as a matching feature point. A final matching point set obtained is that: feature point set $X=[x_1, x_2, \ldots, x_N]_{3 \times N}$ in $T_i^P$ corresponds to the feature point set $Y=[y_1, y_2, \ldots, y_N]_{3 \times N}$ in $R_i^P$ in sequence, where both $x_i$, $y_i$ are homogeneous coordinates.

Second step: the homography matrix is calculated. Four pairs of matching points are randomly selected from X,Y, data is normalized, and a transformation matrix H is solved and is recorded as model M. Projection errors between all data in a data set and the model M are calculated, and the number of interior points is recorded. A transformation matrix corresponding to an optimal model is selected as a homography matrix $H_i$ between $D_i^P$, $C_i^P$ after iteration is completed.

(2) Singular value decomposition is performed for each homography matrix $H_i$ to solve corresponding rotation matrix and translation vector, that is, the camera relative pose $P_i$ guided by the group of matched planes.

Note 5: Estimation of Camera Relative Pose Guided by Matched Plane Pair

First step: a candidate camera relative pose is calculated. For each homography matrix H and a camera internal parameter matrix K, $A=K^{-1}HK$ may be obtained.

Singular value decomposition $A=U\Lambda V^T$ of a matrix is performed on A, where $\Lambda=\text{diag}(\lambda_1, \lambda_2, \lambda_3)(\lambda_1 \geq \lambda_2 \geq \lambda_3)$. According to the physical meaning of the homography matrix, it may be obtained that rotation matrix r, translation vector t, plane normal vector n, and the distance d between a plane and a camera have the following relationship:

$$\begin{cases} r' = sU^T rV \\ t' = U^T t \\ n' = V^T n \\ d' = sd \\ s = \det U \det V \end{cases}$$

Then, $\Lambda = d'r' + t'n'^T$, eight groups of arithmetic solutions $\{(r_i, t_i)\}_{i=1}^8$ may be obtained by solving the equation, that is, a candidate sequence of the camera relative pose guided by the matched planes corresponding to the decomposed homography matrix H.

Second step: a camera relative pose is selected. The matching feature points participating in calculation are triangulated by using each group of arithmetic solutions $(r_i, t_i)$ in the candidate sequence of the camera relative pose to restore three-dimensional spatial point coordinates corresponding to feature points on an image. The number of the three-dimensional spatial points restored by each group of arithmetic solutions satisfying that the spatial points are located in front of a camera model is counted, and meanwhile, re-projection errors are counted. Finally, the group of arithmetic solutions with the largest number of spatial points located in front of the camera model and a small re-projection error is the camera relative pose $P_i$ guided by a group of matched planes.

(IV) Obtaining of Information for Guiding Motion of Camera

A specific method for obtaining the information for guiding the motion of the camera by using all camera relative poses $P_i$ is as follows:

(1) The number of the SIFT feature points participating in the calculation of each camera relative pose $P_i$ and the distribution of the feature points on the plane are determined.

(2) Weight fusion is performed on all camera relative poses $P_i$ by taking the number of the SIFT feature points corresponding to each camera relative pose $P_i$ and the distribution situation as weights, so as to obtain final information $\overline{P}$ for guiding the motion of the camera.

Note 6: Establishment of Fusion Weight

First step: numerical weight $\varphi_i$ is determined by using the ratio of the number of the feature matching point pairs participating in the calculation of the camera relative pose $P_i$ to the number of the feature matching point pairs participating in the calculation of all L camera relative poses in s.

Second step: distribution weight $\text{Ili}$: the effective plane region image $T_i^P$ participating in the calculation of the camera relative pose $P_i$ is clipped according to a circumscribed rectangle of a plane region shape to generate $\overline{T}_i^P$, $\overline{T}_i^P$ is uniformly segmented into a 10×10 grid region, the number of the feature matching points participating in the calculation of the camera relative pose $P_i$ in each grid region is counted, and the variance of the numbers of these related feature matching points distributed in various grid regions is calculated, so as to calculate the distribution weight, where the smaller the variance, the higher the weight.

Note 7: Determination of Information for Guiding Motion of Camera

First step: the rotation matrix in the camera relative pose $P_i$ is transformed into an Euler angle expression form, that is, $r \triangleq \langle r^X, r^Y, r^Z \rangle$. Where, $r^X$, $r^Y$, $r^Z$ respectively represent Euler rotation angles in three coordinate directions in a three-dimensional space.

Second step: all camera relative poses $P_i$ are fused by using the calculated numerical weight $\varphi_i$ and the distribution weight $\text{Ili}$.

$$\begin{cases} \tilde{r}^* = \sum_{i=1}^{K} (\sigma_1 \varphi_i r_i^* + \sigma_2 \eta_i r_i^*) \\ \tilde{t} = \sum_{i=1}^{K} (\sigma_1 \varphi_i t_i + \sigma_2 \eta_i t_i) \\ * \in \{X, Y, Z\} \end{cases}$$

Where, $\sigma_1$, $\sigma_2$ ($\sigma_1+\sigma_2=1$) represent the influence proportions of the numerical weight and the distribution weight on the fusion, and the final information for guiding the motion of the camera is obtained. Based on experience, the influence proportions of the numerical weight and the distribution weight on the fusion are 0.8 and 0.2 respectively.

(V) Determination of Completion of Relocation

A specific method for determining whether a relocation process is completed or not includes:

since the calculated translation vector inevitably lacks a physical real scale, the motion of the camera is guided, according to the translation direction information provided by the obtained translation vector, by using a "binary half-division" strategy used in the existing relocation method. When a motion step is less than a threshold value $\xi$, it is determined that the relocation process is completed, and the relocation is ended; and otherwise, Step (I) to Step (V) are repeated. When it is not the first iteration, the plane region in a scene in a reference image does not need to be extracted repeatedly in Step I, and primary information is used.

Figure 3:
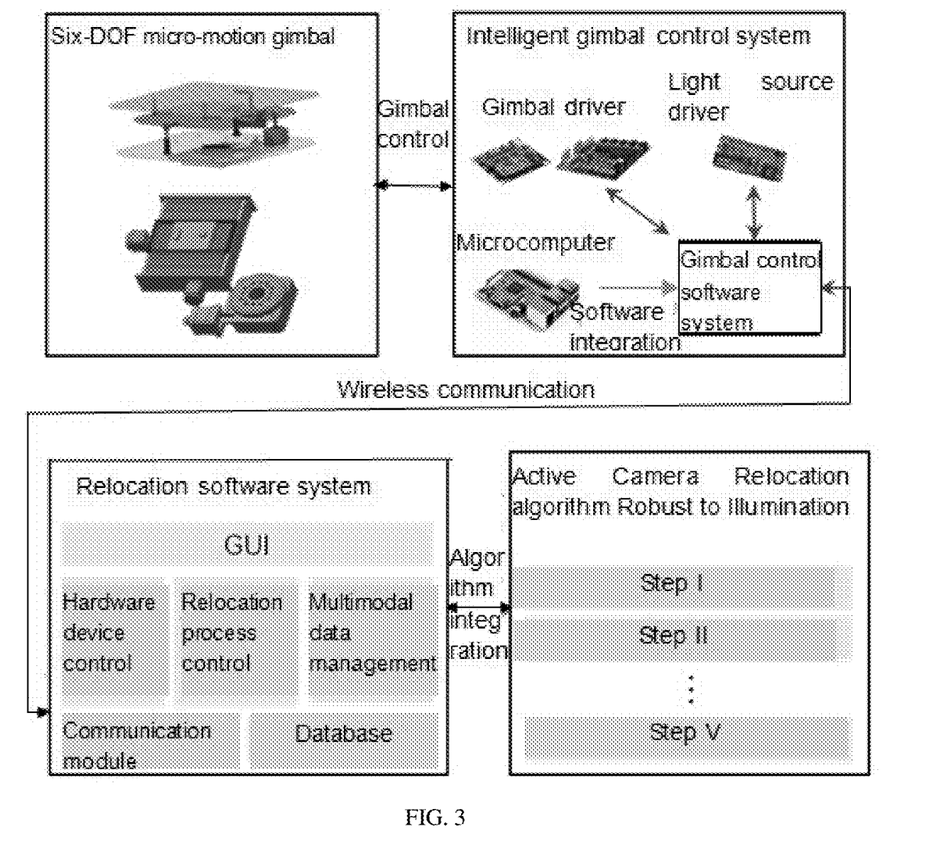
FIG. 3 is a schematic diagram of relocation software and hardware systems of Embodiment 2.
Figure 4:
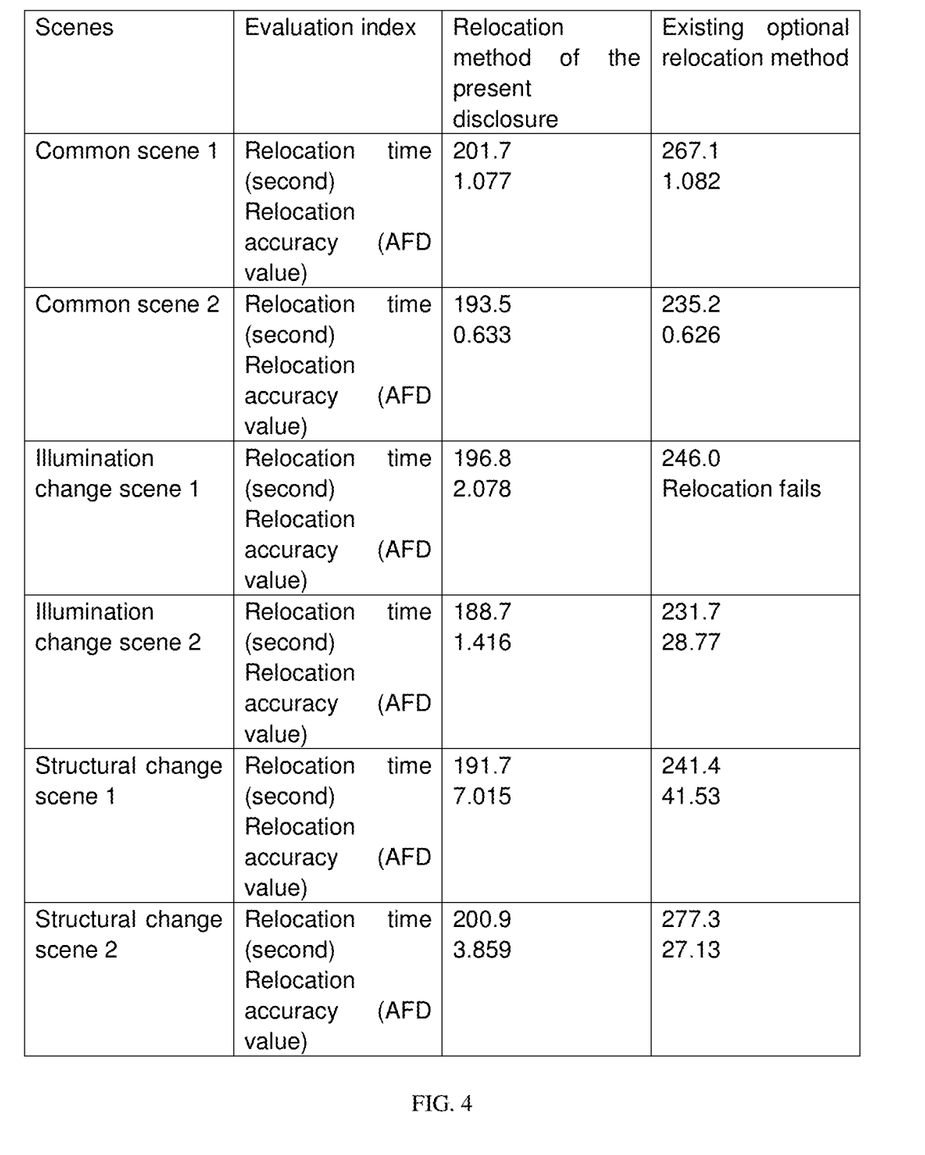
FIG. 4 is comparison of time and accuracy of the method of the present disclosure and an existing optimal relocation method.

(VI) Implementation of Accurate Relocation of Camera by Using Relocation Software and Hardware System Accurate relocation of the camera is implemented by using a relocation software and hardware system as shown in FIG. 3. The relocation software and hardware system consists of four modules of a six-DOF micro-motion gimbal, an intelligent gimbal control system, a relocation software system, and an active camera relocation method robust to illumination. The Intelligent gimbal control system includes a gimbal driver, a light source driver, and a microcomputer including a processor having a gimbal control software system to control the gimbal driver and light source driver. The relocation software system may be implemented by the intelligent gimbal control system or on a separate device comprising at least a processor and a non-transitory memory storing program instructions that, when executed by the processor, perform the steps of the active camera relocation method. The relocation software system integrates the above mentioned method process. In actual work, staff selects a historical observation image according to a prompt of a User Interface (UI) of a software system, and then the system automatically executes the abovementioned method, that is, Step (I) to Step (V). In Step (IV), the final information $\overline{P}$ for guiding the motion of the camera is obtained by the method. The software system sends a motion instruction to the intelligent gimbal control system, and then the intelligent gimbal control system drives the six-DOF micro-motion gimbal to execute the motion according to final information $\overline{P}$. After execution, the intelligent gimbal control system returns a motion completion instruction to the relocation software system, and performs next method iteration. After a determination condition in Step (V) is satisfied, the system photographs a current image, and the relocation of the camera is completed.

The feasibility of the method of the present disclosure is verified in combination with specific embodiments:

A mechanical monitoring platform carrying a Canon 5DMarkIII camera is used for performing a relocation experiment. For the same monitoring target, a device performs a relocation operation by using the method of the present disclosure and the most advanced existing relocation method respectively. The experiment is performed in three types of indoor and outdoor monitoring scenes, including a common scene (without obvious illumination or scene structure changes), an illumination change scene (the relocation operation is performed in different weathers and at different times outdoors, and the relocation operation is performed under a group of LED lamps with controllable directions and intensity), and a structure change scene (the relocation operation is performed in a scene with a large amount of vegetation in different seasons, and the relocation operation is performed in a movable object scene).

The time spent in the relocation process and an Average Distance of Feature Points (AFD) between an image photographed after relocation and a reference image are analyzed according to results, so as to obtain indexes for evaluating a relocation method. The AFD refers to an average value of the Euclidean distance between all matched feature points of two images, which can intuitively evaluate the accuracy of relocation.

Figure 1:
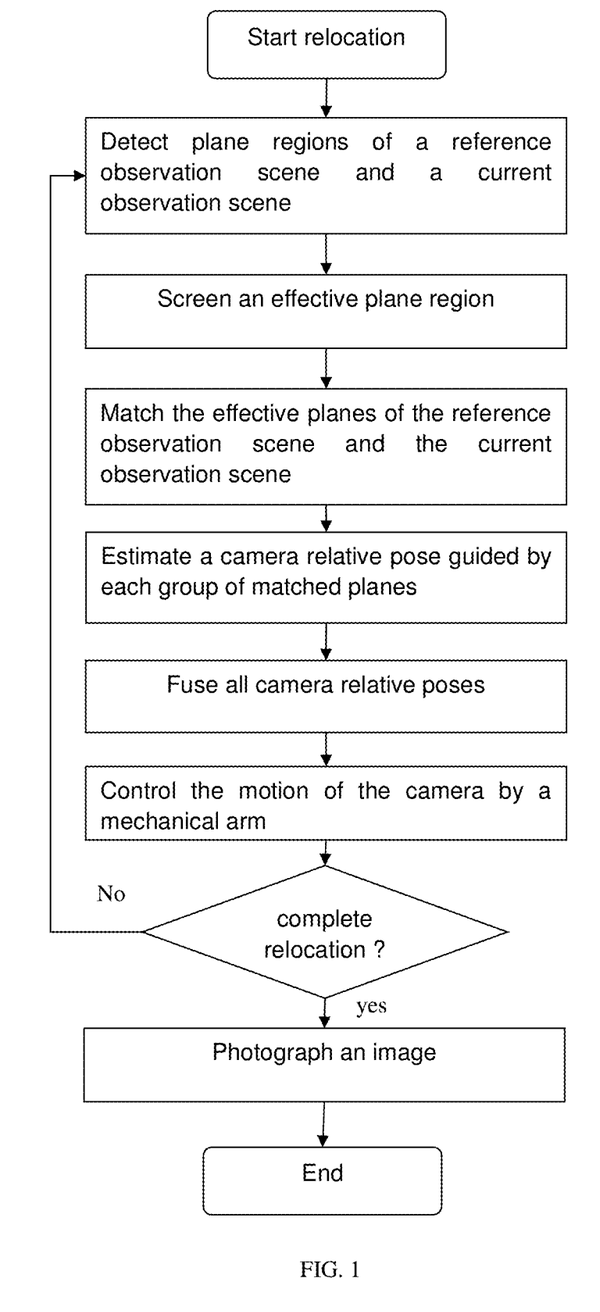
FIG. 1 is a flowchart of an active camera relocation method of Embodiment 1 of the present disclosure.
Figure 2:
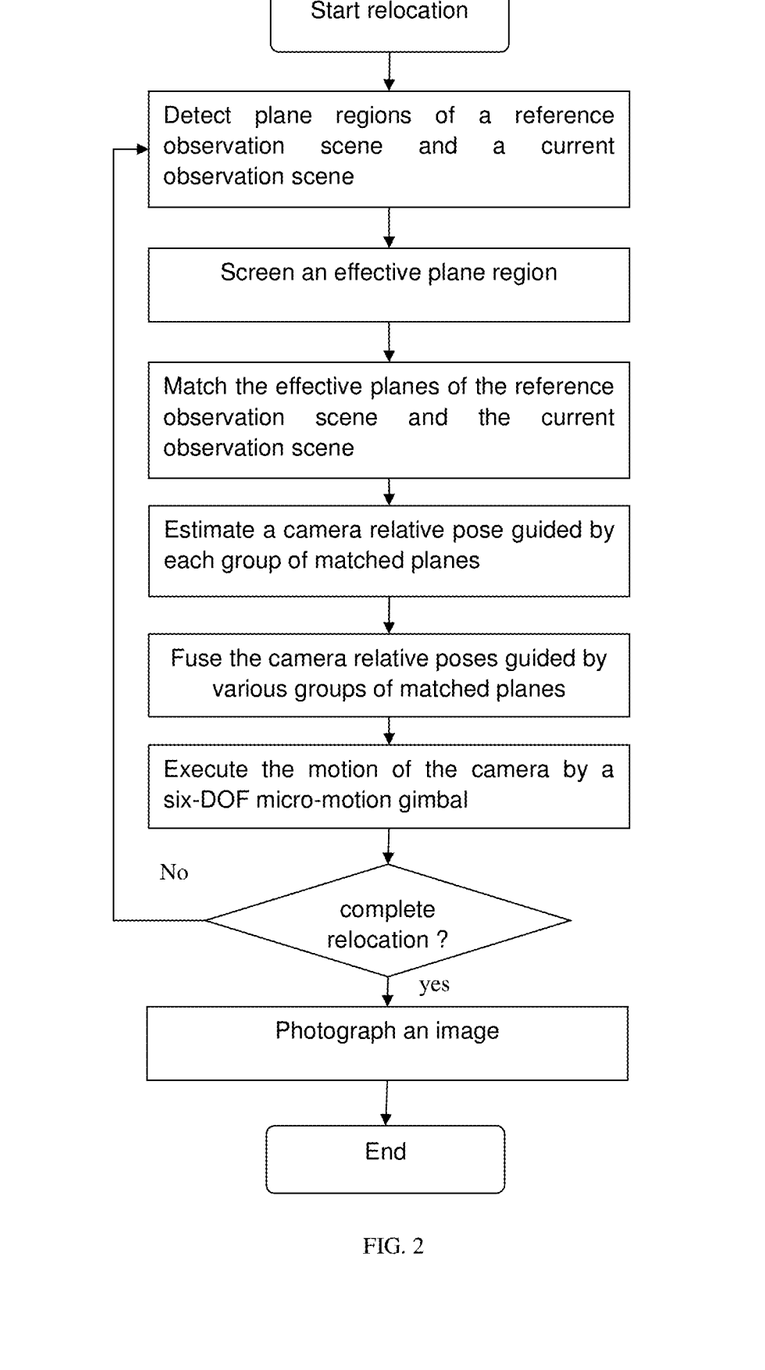
FIG. 2 is a flowchart of an active camera relocation method robust to illumination of Embodiment 2 of the present disclosure.

The results of the relocation operation of this method and the existing optimal relocation method [3] in different scenes shown in FIG. 2 show that: the relocation accuracy of the two relocation methods has no significant difference between advantages and disadvantages for a common detection scene without obvious illumination and scene structure changes, but the time performance of this method is better; for the scenes with the changes in illumination intensity and illumination direction, this method not only has good advantages in time performance, but also has significant advantages in relocation accuracy. Especially for outdoor scene, when the relocation operation of the advanced existing relocation method fails, the relocation results of this method still support relevant requirements under the same conditions. For the scenes with obvious scene structure changes, this method shows significant advantages in terms of time performance and relocation accuracy. Therefore, the feasibility and the superiority of the method of the present disclosure can be demonstrated.

What is claimed is:

1. An active camera relocation method having robustness to illumination, implemented via a processor, which includes the following steps:

Step I: extracting effective plane region image sets $\mathcal{T}=\{T_n^P\}_{n=1}^N$ and $\mathcal{R}=\{R_m^P\}_{m=1}^M$ of scenes in a current observation image T and a reference observation image R, where N represents a total number of planes, n is a plane index, and p is an identifier representing a plane, M represents a total number of planes, m is a plane index, and p is an identifier representing a plane;

Step II: establishing a matching relationship in the effective plane region image sets T and R, which adopts the following method:

(1) for the effective plane region image set T, calculating the number of the SIFT feature points of each plane region image $T_n^P$; calculating the minimum Euclidean distance between every two plane region images; and performing the same operation on the effective plane region image set R;

(2) for the effective plane region image set $\mathcal{T}$, establishing an undirected fully connected graph $\mathcal{G}=\{V^{(1)}, E^{(1)}\}$ by taking each plane region image $T_n^P$ as a node, where V represents a node set, and each node corresponds to one plane; and E is an edge set, and each edge represents the Euclidean distance between the planes represented by two nodes on the edge; and performing the same operation on the effective plane region image set $\mathcal{R}$ to obtain an undirected fully connected graph $\mathcal{G}_2=\{V^{(2)}, E^{(2)}\}$;

(3) solving a graph matching problem between $\mathcal{G}$ and $\mathcal{G}$ by taking the numbers of the SIFT feature points of the plane images as node weights of the graphs and the Euclidean distances between the plane images as edge weights of the graphs, and establishing a matching relationship $S=\{(R_i^P, T_i^P)\}_{i=1}^L$ in the effective plane region image sets T and R, where L represents the number of images with the matching relationship in the current observation image and the reference observation image, and i is an index;

Step III: obtaining a camera relative pose $P_i$ guided by each group of matched planes;

Step IV: obtaining information for guiding the motion of a camera by fusing all camera relative poses $P_i$;

Step V: determining whether a relocation process is completed or not; ending the method if the relocation is completed; otherwise, repeating and iterating Step I to Step V; and Step VI: relocating the camera by using a system comprising a six-DOF micro-motion gimbal, an intelligent gimbal control system, and a relocation software system.

2. The active camera relocation method having robustness to illumination according to claim 1, wherein Step I specifically includes:

(1) for an observation object, selecting an original scene image, and respectively detecting plane regions of scenes in a current observation image T and a reference observation image R to obtain plane region image sets $\mathcal{T}=\{T_n^P\}$ and $\mathcal{R}=\{R_m^P\}$;

(2) respectively selecting effective plane regions from the plane region image sets $\mathcal{T}=\{T_n^P\}$ and $\mathcal{R}=\{R_m^P\}$ to obtain effective plane region image sets $\mathcal{T}=\{T_n^P\}_{n=1}^N$ and $\mathcal{R}=\{R_m^P\}_{m=1}^M$, where the method is as follows:

first step: determining an area ratio: respectively calculating the ratio of an image area of the detected plane region to the area of the original scene image;

second step: setting a threshold value, and respectively selecting regions with the ratio of the image area of the plane region to the area of the scene image greater than the threshold value from the sets $\mathcal{T}=\{T_n^P\}$ and $\mathcal{R}=\{R_m^P\}$ to form effective plane region image sets $\mathcal{T}=\{T_n^P\}_{n=1}^N$ and $\mathcal{R}=\{R_m^P\}_{m=1}^M$;

third step: if the ratios of the image area of all plane regions in the sets $\mathcal{T}=\{T_n^P\}$ and $\mathcal{R}=\{R_m^P\}$ are all less than the threshold value, determining the effective plane region image sets $\mathcal{T}=\{T_n^P\}_{n=1}^N$ and $\mathcal{R}=\{R_m^P\}_{m=1}^M$ according to the image regions with the larger area ratio of the plane region in respective set;

(3) performing image morphological corrosion on all plane region images in the effective plane region image sets $\mathcal{T}=\{T_n^P\}_{n=1}^N$ and $\mathcal{R}=\{R_m^P\}_{m=1}^M$ to obtain all effective plane region image sets $\mathcal{T}=\{T_n^P\}_{n=1}^N$ and $\mathcal{R}=\{R_m^P\}_{m=1}^M$.

3. The active camera relocation method having robustness to illumination according to claim 2, the threshold value set in the second step is 10%.

4. The active camera relocation method having robustness to illumination according to claim 1, wherein Step III specifically includes:

first step: for each pair of matching planes $(R_i^P, T_i^P)$, calculating a homography matrix $H_i$ between $T_i^P$ and $R_i^P$;

second step: respectively performing singular value decomposition on each homography matrix $H_i$ to solve corresponding rotation matrix and translation vector, that is, the camera relative pose $P_i$ guided by the group of matched planes.

5. The active camera relocation method having robustness to illumination according to claim 1, wherein Step IV specifically includes:

(1) determining the number of the SIFT feature points participating in the calculation of each camera relative pose $P_i$ and the distribution of the feature points on a plane;

(2) performing weight fusion according to the number of the SIFT feature points, that is a numerical weight, corresponding to each camera relative pose $P_i$ and the distribution situation, that is a distribution weight, of the SIFT feature points, and performing weighted fusion on all camera relative poses $P_i$ according to respective influence proportion of the numerical weight and the distribution weight on the camera relative pose, so as to obtain final information for guiding the motion of the camera, where a method for determining the numerical weight and the distribution weight is as follows:

first step: the numerical weight $\varphi_i$ being determined by using the ratio of the number of the feature matching point pairs participating in the calculation of the camera relative pose $P_i$ to the number of the feature matching point pairs participating in the calculation of all L camera relative poses in the matching relationship S;

second step: the distribution weight $\eta_i$ being determined by: clipping the effective plane region image $T_i^P$ participating in the calculation of the camera relative pose $P_i$ according to a circumscribed rectangle of a plane region shape to generate $T_i^P$, uniformly segmenting $T_i^P$ into grid regions, counting the number of the feature matching points participating in the calculation of the camera relative pose $P_i$ in each grid region, and calculating the variance of the numbers of these related feature matching points distributed in various grid regions, so as to calculate the distribution weight, where the smaller the variance, the higher the weight.

6. The active camera relocation method having robustness to illumination according to claim 1, wherein Step V specifically includes: determining whether to end the relocation according to the scale of a translation dimension in camera motion information; and when a motion step is less than a step threshold value $\xi$, determining that a relocation process is completed, and ending the relocation; and otherwise, repeating Step I to Step V.

7. The active camera relocation method having robustness to illumination according to claim 1, wherein the proportions of the numerical weight and the distribution weight are 0.8 and 0.2 respectively.

8. The active camera relocation method having robustness to illumination according to claim 1, wherein Step VI specifically includes:
- transmitting a motion instruction from the relocation software system to the intelligent gimbal control system;
- driving, via the intelligent gimbal system, the six-DOF micro-motion gimbal to execute the motion instruction according to the information for guiding the motion of the camera obtained in Step IV; and
- returning, via the intelligent gimbal system, a motion completion instruction to the relocation software system.

9. An active camera relocation system, comprising:
a camera;
a six-degree-of-freedom (DOF) micro-motion gimbal;
an intelligent gimbal control system; and
a relocation software system;
wherein the relocation software system comprises a processor; and
a memory storing program instructions that, when executed by the processor, is configured to perform the following steps:
Step I: extracting effective plane region image sets $\mathcal{T}=\{T_n^P\}_{n=1}^N$ and $\mathcal{R}=\{R_m^P\}_{m=1}^M$ of scenes in a current observation image T and a reference observation image R, where N represents a total number of planes, n is a plane index, and p is an identifier representing a plane, M represents a total number of planes, m is a plane index, and p is an identifier representing a plane;
Step II: establishing a matching relationship in the effective plane region image sets T and R, which adopts the following method:
(1) for the effective plane region image set T, calculating the number of the SIFT feature points of each plane region image $T_n^P$; calculating the minimum Euclidean distance between every two plane region images; and performing the same operation on the effective plane region image set R;
(2) for the effective plane region image set $\mathcal{T}$, establishing an undirected fully connected graph $\mathcal{G}=\{V^{(1)},E^{(1)}\}$ by taking each plane region image $T_n^P$ as a node, where V represents a node set, and each node corresponds to one plane; and E is an edge set, and each edge represents the Euclidean distance between the planes represented by two nodes on the edge; and performing the same operation on the effective plane region image set $\mathcal{R}$ to obtain an undirected fully connected graph $\mathcal{G}=\{V^{(2)},E^{(2)}\}$;
(3) solving a graph matching problem between $\mathcal{G}$ and $\mathcal{G}$ by taking the numbers of the SIFT feature points of the plane images as node weights of the graphs and the Euclidean distances between the plane images as edge weights of the graphs, and establishing a matching relationship $S=\{(R_i^P,T_i^P)\}_{i=1}^L$ in the effective plane region image sets T and R, where L represents the number of images with the matching relationship in the current observation image and the reference observation image, and i is an index;
Step III: obtaining a camera relative pose $P_i$ guided by each group of matched planes;
Step IV: obtaining information for guiding the motion of the camera by fusing all camera relative poses $P_i$;
Step V: determining whether a relocation process is completed or not; ending the method if the relocation is completed; otherwise, repeating and iterating Step I to Step V; and
Step VI: relocating the camera according to the information obtained in step IV using the six-DOF micro-motion gimbal, the intelligent gimbal control system, and the relocation software system.

10. The active camera relocation system according to claim 9, wherein Step I specifically includes:
(1) for an observation object, selecting an original scene image, and respectively detecting plane regions of scenes in a current observation image T and a reference observation image R to obtain plane region image sets $\mathcal{T}=\{T_n^P\}$ and $\mathcal{R}=\{R_m^P\}$;
(2) respectively selecting effective plane regions from the plane region image sets $\mathcal{T}=\{T_n^P\}$ and $\mathcal{R}=\{R_m^P\}$ to obtain effective plane region image sets $\mathcal{T}=\{T_n^P\}_{n=1}^N$ and $\mathcal{R}=\{R_m^P\}_{m=1}^M$, where the method is as follows:
first step: determining an area ratio: respectively calculating the ratio of an image area of the detected plane region to the area of the original scene image;
second step: setting a threshold value, and respectively selecting regions with the ratio of the image area of the plane region to the area of the scene image greater than the threshold value from the sets $\mathcal{T}=\{T_n^P\}$ and $\mathcal{R}=\{R_m^P\}$ to form effective plane region image sets $\mathcal{T}=\{T_n^P\}_{n=1}^N$ and $\mathcal{R}=\{R_m^P\}_{m=1}^M$;
third step, if the ratios of the image area of all plane regions in the sets $\mathcal{T}=\{T_n^P\}$ and $\mathcal{R}=\{R_m^P\}$ are all less than the threshold value, determining the effective plane region image sets $\mathcal{T}=\{T_n^P\}_{n=1}^N$ and $\mathcal{R}=\{R_m^P\}_{m=1}^M$ according to the image regions with the larger area ratio of the plane region in respective set;
(3) performing image morphological corrosion on all plane region images in the effective plane region image sets $\mathcal{T}=\{T_n^P\}_{n=1}^N$ and $\mathcal{R}=\{R_m^P\}_{m=1}^M$ to obtain all effective plane region image sets $\mathcal{T}=\{T_n^P\}_{n=1}^N$ and $\mathcal{R}=\{R_m^P\}_{m=1}^M$.

11. The active camera relocation system according to claim 10, the threshold value set in the second step is 10%.

12. The active camera relocation system according to claim 9, wherein Step III specifically includes:
first step: for each pair of matching planes $(R_i^P,T_i^P)$, calculating a homography matrix $H_i$ between $T_i^P$ and $R_i^P$;
second step: respectively performing singular value decomposition on each homography matrix $H_i$ to solve corresponding rotation matrix and translation vector, that is, the camera relative pose $P_i$ guided by the group of matched planes.

13. The active camera relocation system according to claim 9, wherein Step IV specifically includes:
  (1) determining the number of the SIFT feature points participating in the calculation of each camera relative pose $P_i$ and the distribution of the feature points on a plane;
  (2) performing weight fusion according to the number of the SIFT feature points, that is a numerical weight, corresponding to each camera relative pose $P_i$ and the distribution situation, that is a distribution weight, of the SIFT feature points, and performing weighted fusion on all camera relative poses $P_i$ according to respective influence proportion of the numerical weight and the distribution weight on the camera relative pose, so as to obtain final information for guiding the motion of the camera, where a method for determining the numerical weight and the distribution weight is as follows:
    first step: the numerical weight $\varphi_i$ being determined by using the ratio of the number of the feature matching point pairs participating in the calculation of the camera relative pose $P_i$ to the number of the feature matching point pairs participating in the calculation of all L camera relative poses in the matching relationship S;
    second step: the distribution weight $\eta_i$ being determined by: clipping the effective plane region image $T_i^P$ participating in the calculation of the camera relative pose $P_i$ according to a circumscribed rectangle of a plane region shape to generate $\overline{T}_i^P$, uniformly segmenting $\overline{T}_i^P$ into grid regions, counting the number of the feature matching points participating in the calculation of the camera relative pose $P_i$ in each grid region, and calculating the variance of the numbers of these related feature matching points distributed in various grid regions, so as to calculate the distribution weight, where the smaller the variance, the higher the weight.

14. The active camera relocation system according to claim 9, wherein Step V specifically includes:
  determining whether to end the relocation according to the scale of a translation dimension in camera motion information; and when a motion step is less than a step threshold value $\xi$, determining that a relocation process is completed, and ending the relocation; and otherwise, repeating Step I to Step V.

15. The active camera relocation system according to claim 9, wherein the proportions of the numerical weight and the distribution weight are 0.8 and 0.2 respectively.

16. The active camera relocation system according to claim 9, wherein Step VI specifically includes:
  transmitting a motion instruction from the relocation software system to the intelligent gimbal control system;
  driving, via the intelligent gimbal system, the six-DOF micro-motion gimbal to execute the motion instruction according to the information for guiding the motion of the camera obtained in Step IV; and
  returning, via the intelligent gimbal system, a motion completion instruction to the relocation software system.

* * * * *